United States Patent [19]
Garcia Aguilera et al.

[11] Patent Number: 5,854,976
[45] Date of Patent: Dec. 29, 1998

[54] SUBSCRIBER IDENTITY AUTHENTICATION IN FIXED CELLULAR TERMINALS

[75] Inventors: Jose Maria Garcia Aguilera; Jose Maria Rodrigo Sanchez, both of Madrid, Spain

[73] Assignee: Alcatel N.V., Rijswijk, Netherlands

[21] Appl. No.: 700,535

[22] PCT Filed: Dec. 21, 1995

[86] PCT No.: PCT/EP95/05077

§ 371 Date: Nov. 13, 1996

§ 102(e) Date: Nov. 13, 1996

[87] PCT Pub. No.: WO96/21377

PCT Pub. Date: Jul. 11, 1996

[30] Foreign Application Priority Data

Dec. 30, 1994 [ES] Spain .................................. 9402693

[51] Int. Cl.$^6$ ............................ H04B 1/38; H04M 11/00
[52] U.S. Cl. ........................................ 455/411; 455/558
[58] Field of Search .................................. 455/410, 411, 455/433, 461, 550, 558, 561, 554, 575; 379/91.01, 143, 144, 145, 155, 357; 380/23; 235/380

[56] References Cited

U.S. PATENT DOCUMENTS

| 4,680,785 | 7/1987 | Akiyama et al. | 455/558 |
| 5,266,782 | 11/1993 | Alanara et al. | 379/144 |
| 5,353,328 | 10/1994 | Jokimies | 455/558 |
| 5,404,580 | 4/1995 | Simpson et al. | 455/558 |
| 5,444,764 | 8/1995 | Galecki | 455/558 |
| 5,448,764 | 9/1995 | Sondermann et al. | 455/410 |
| 5,497,411 | 3/1996 | Pellerin | 455/558 |

FOREIGN PATENT DOCUMENTS

| 0301740 | 2/1989 | European Pat. Off. . |
| 9217379 | 6/1993 | Germany . |

OTHER PUBLICATIONS

European Telecommunication Standard (prETS 300 509), May, 1994, European digital cellular telecommunications system Phase 2; Subscriber Identity Modules (SIM) Functional Characteristics (GSM 02.17).

European Telecommunication Standard (ETS 300 509), Sep., 1994, European digital cellular telecommunications system Phase 2; Subscriber Identity Modules (SIM) Functional Characteristics (GSM 02.17).

Primary Examiner—Thanh Cong Le
Assistant Examiner—Lester G. Kincaid
Attorney, Agent, or Firm—Ware, Fressola, Van Der Sluys & Adolphson LLP

[57] ABSTRACT

The fixed cellular terminals (TCF) include a subscriber identity module which, in order to permit authentication of the identity of the subscriber (U) without any intervention on his part, is fixed. It is of particular application in fixed cellular terminals (TCF) of the GSM type that form part of an access network based on the infrastructure of acellular mobile network. These subscriber identity modules incorporate the function of the subscriber identification number verification. During the installation stage each fixed cellular terminal (TCF) stores the subscriber identification number, which it later provides to the subscriber identity module making it become fully active when the number supplied coincides with that held in the subscriber identity module. In the initialization process, the fixed cellular terminal (TCF) generates a new subscriber identification number, that it stores internally in its subscriber identity module for use in subsequent reinitializations.

4 Claims, 2 Drawing Sheets

SUBSCRIBER IDENTITY AUTHENTICATION IN FIXED CELLULAR TERMINALS

This invention refers to a procedure for subscriber identity authentication for fixed cellular terminals in radio access networks for fixed subscribers.

This procedure is of special application in fixed cellular terminals of the GSM type that form part of an access network for fixed subscribers, implemented making use of the infrastructure of a cellular mobile network, permitting authentication of subscriber identity without any intervention being required on the part of the fixed subscribers in question.

The use of mobile cellular terminals with "fixed mobility" for access to two-wire fixed subscriber networks is very suitable for those situations where the major investment required for the installation of a wired access network is not justified because, for example, of a low subscriber density. These subscribers therefore, make use of mobile cellular technology in the fixed access network, but tariffication of their calls is the same as that of those subscribers with wired access networks.

The fixed cellular terminals have their own design, since they are not equipped with the proper mobility functions (handover, roaming, etc.), for which they have no need. On the other hand, however, they have to support new features that are not required in true mobile cellular terminals (for example, the subscriber side two-wire interface function).

Depending on the type, the cellular terminals, whether or not they have fixed mobility, can include a module in which reside the functions required for subscriber identity authentication, for which they make use of subscriber identification numbers that are allocated to the subscribers in such a way that each number identifies a single subscriber. This module, for the case of cellular terminals with GSM technology, is known as the Subscriber Identity Module, or SIM. In the case of mobile cellular terminals, this module takes the form of a board that can be removed from the terminal; while in the case of cellular terminals with fixed mobility, this module is internal and built into the terminals in such a way that the subscriber is completely detached from how he accesses the main network using cellular technology, since access is obtained in the same way as that of a subscriber to a wired access network.

The European standard ETS 300 509 "European Digital Cellular Telecommunication System (phase 2); Subscriber Identity Modules (SIM) Functional Characteristics (GSM 02.17)", September 1994, developed by the Technical Committee SMG (Special Mobile Group) of the ETSI, defines the functional characteristics of this subscriber identity module (SIM) for use in GSM applications.

On page 12 of the document mentioned, and within the section concerning security aspects, reference is made to the presence of this subscriber identity module SIM with the verification function of the subscriber identification number. When this function is enabled, the subscriber identity module SIM, to become fully activated and thereby to permit access to all its functions, first requires the insertion of the subscriber identification number and that this number coincide with the subscriber identification number which has been stored in it during manufacture.

This function facilitates protection against the use of other subscriber identity modules SIM or of cellular terminals that incorporate them, by others apart from authorised persons. On the other hand, the enabling of this function in fixed cellular terminals that form part of an access network for two-wire subscribers, would result in an inconvenience for them, since, in some manner, they would have to introduce from their terminal their subscriber identification number each time they make a call.

The European standard mentioned permits the inhibition of this function; consequently it is disabled when cellular terminals with fixed mobility are used as integral parts of wired networks, in order to avoid inconvenience to subscribers. However with this, there is still the potential risk that these modules with the function in question disabled, could be removed from the fixed cellular terminals and used, for example, in mobile cellular terminals since they have no need for introducing any subscriber identification number to make calls, these calls moreover being charged at wired network rates.

As a consequence of the foregoing, the technical problem to be overcome lies in how to ensure that the use of cellular terminals with fixed mobility as integral parts of access networks does not impair the security functions incorporated in these terminals, without this involving any inconvenience or complication for subscribers when making calls, there being complete transparency for a subscriber with a fixed mobility cellular terminal.

SUMMARY OF THE INVENTION

This invention presents a procedure for subscriber identity authentication for fixed cellular terminals, through the use of subscriber identification numbers. To implement the procedure in question, the subscriber identity module has the verification function of the subscriber identification number enabled.

The procedure consists in that, during the installation process, each fixed cellular terminal has the subscriber identification number stored in it, which it subsequently transmits to its particular subscriber identity module permitting this module to become fully activated if the number supplied coincides with that stored internally in the module.

When initialising the equipment, each fixed cellular terminal generates a new subscriber identification number, which it stores in the terminal itself and in its corresponding subscriber identity module. The new subscriber identification number activates the subscriber identity module in later reinitialisations.

The advantages of using this procedure are that, making use of mobile cellular technology, it permits the use of fixed cellular terminals with all their security functions enabled in order to provide access to a wired network for a group of fixed subscribers, in those cases where it is not economically or technically feasible to implement a wired access network. In this way, subscriber identity authentication is performed, avoiding the possibility of fraudulent use but without causing any inconvenience to the fixed subscribers, since the later have no need to intervene in any way and therefore have access to the telephone service in identical manner that subscribers to wired networks.

BRIEF DESCRIPTION OF THE FIGURES

A fuller explanation of the invention can be obtained from the following description of a preferred implementation based on the figures attached, in which.

BEST MODE FOR CARRYING OUT THE INVENTION

Figure 1:
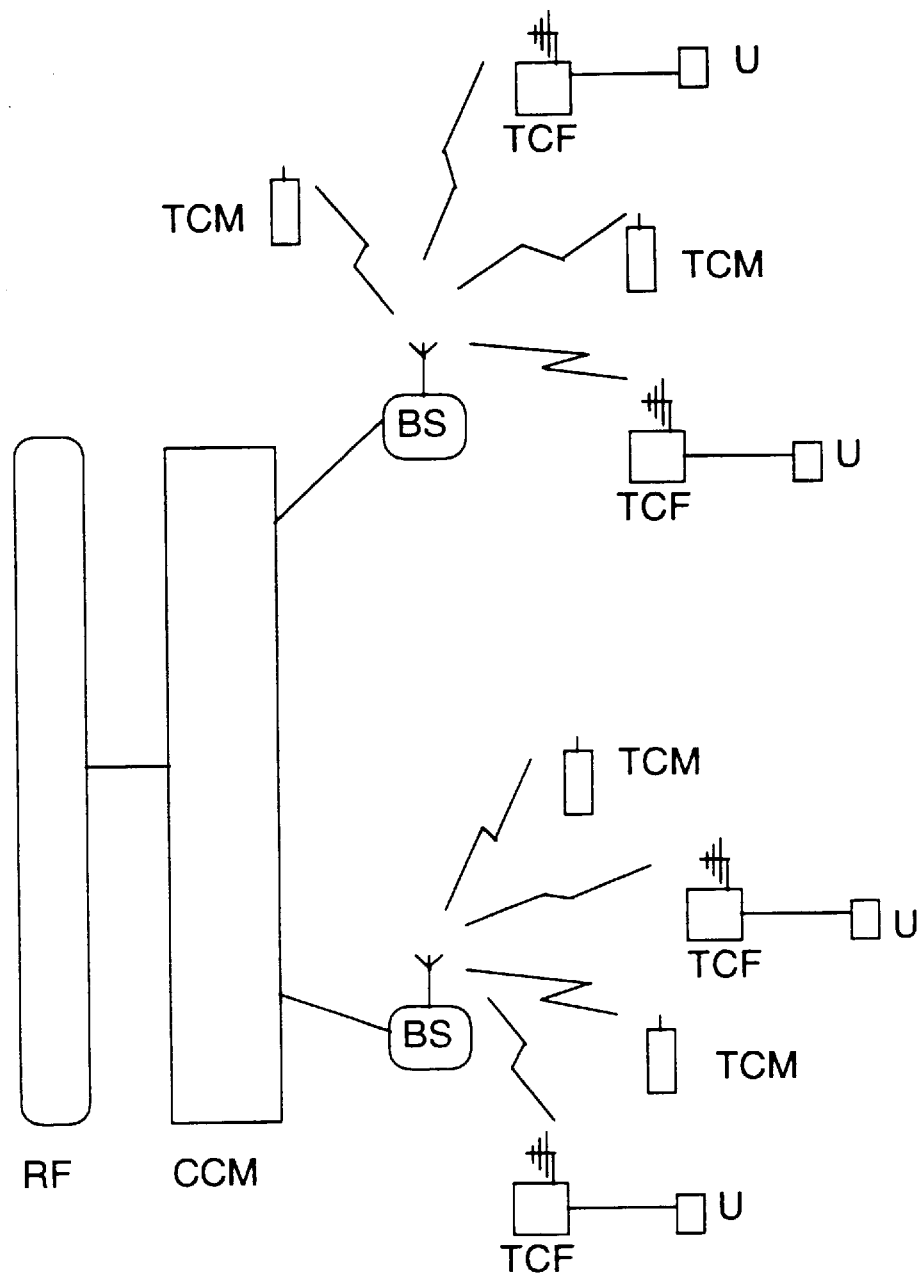
FIG. 1 shows access by subscribers terminals to a wired network by means of a mobile network incorporating fixed cellular terminals in which the subscriber identity authentication procedure object of this invention has been implemented.

The drawing of FIG. 1 shows a fixed subscriber access communications system implemented by taking advantage of an already established mobile communications infrastructure.

This system incorporates a mobile cellular communications network formed by a mobile switching centre CCM that permits access to a wired network RF and by a set of base stations BS, connected to this mobile switching centre CCM. Each base station BS provides coverage for a determined zone in which there are cellular mobile terminals TCM as well as fixed cellular terminals TCF. In the latter, the subscriber identity authentication procedure of this invention has been implemented. These fixed cellular terminals TCF offer a standard access interface to the wired network RF for a set of fixed subscriber terminals U.

The cellular technology employed in this implementation uses the European standard GSM (Global System for Mobile), developed by the ETSI (European Telecommunications Standards Institute), for standardisation of digital cellular mobile telephony on an European level.

Figure 2:
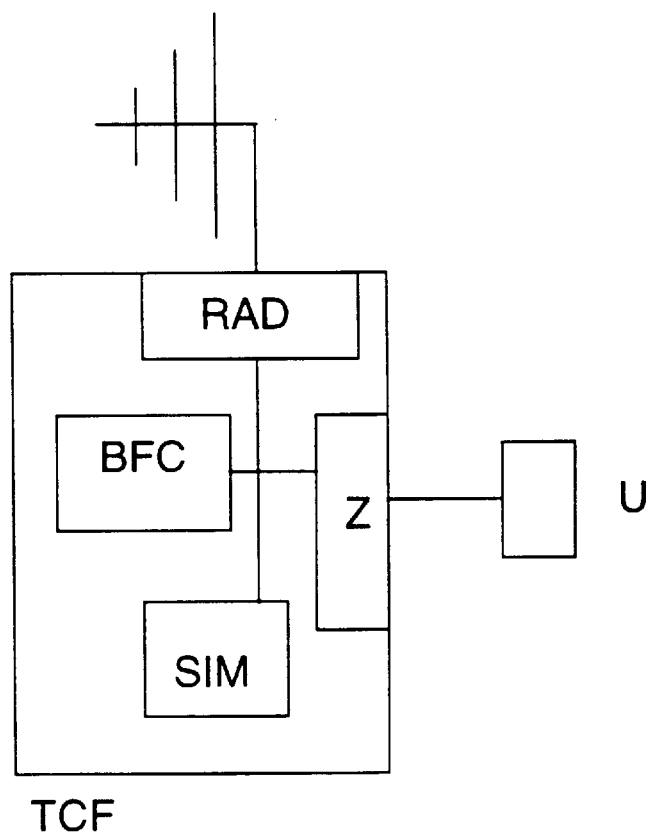
FIG. 2 shows a functional block diagram of a fixed cellular terminal, which implements the subscriber identity authentication procedure object of this invention.

As it is illustrated in FIG. 2, in each fixed cellular terminal TCF the following functional modules can be identified:

- a low frequency signals and control module BFC, for managing audio channels and other control processes;
- a radio module RAD, that performs the functions of transmitting and receiving, by radio, the signals that are interchanged between the fixed cellular terminal TCF itself and the base stations BS;
- an interface module Z in which are grouped together the two-wire subscriber line interface functions;
- a subscriber identity module SIM in which reside the functions that carry out the identity authentication of the subscriber U.

Initially, each subscriber identity module SIM leaves the factory with a subscriber identification number stored in it, and this is known to the operator.

One of the functions directed at the authentication of the subscriber identity above mentioned is the verification function of the subscriber identification number. In the event that it is enabled, for the subscriber identity module SIM to become fully activated and permit access to all the functions resident in it, it is first necessary to provide it with the subscriber identification number.

At this point the subscriber identity module SIM compares the subscriber identification number that it has been provided with, with that which was previously stored, in such a way that the subscriber identity module SIM only permits access to the rest of its functions if the result of the comparison process reveals both numbers to be identical.

In the preferred implementation described below, the subscriber identity module SIM of each fixed cellular terminal TCF is fixed and built-in, and, in contrast with what occurs in the other fixed cellular terminals, it has the verification function of the subscriber identification number enabled, so that initially the subscriber identity module SIM is not fully activated.

At the installation stage of the fixed cellular terminals TCF, the operator inserts in each fixed cellular terminal TCF, from its respective subscriber terminal U, the subscriber identification number that was stored during manufacture in the subscriber identity module SIM corresponding to that fixed cellular terminal TCF. Each fixed cellular terminal TCF stores this number internally in an EEPROM.

The fixed cellular terminal TCF then carries out the complete activation of its subscriber identity module SIM in order to gain full access to all its functions. To this end, and since the subscriber identity module SIM has the verification function of the subscriber identification number enabled, the fixed cellular terminal TCF supplies it with the subscriber identification number previously stored in the EEPROM. The subscriber identity module SIM compares this number that is supplied by the fixed cellular terminal TCF with that which it already had stored in it during manufacture. The result of this comparison is that both numbers coincide, whereby the subscriber identity module SIM becomes fully activated and therefore permits access to all its functions and, for this to happen, there is no requirement for intervention on the part of the subscribers U.

Prior to normal operation, and during the initialisation process, the fixed cellular terminal TCF generates a new subscriber identification number, it being recorded in a buffer memory of the low frequency signals and control module BFC that the installation stage has been completed, in order to indicate this later.

In order to generate the new subscriber identification number, the fixed cellular terminal TCF performs a series of arithmetical functions, such as those described below by way of example:

The fixed cellular terminal TCF takes as input data the subscriber identification number that it has stored in the EEPROM. Following this, it determines the number of digits that constitute this number, and which can vary between four and eight digits. Depending on the result, it adds a number of zeros until an eight-digit number is obtained. Finally the fixed cellular terminal TCF inverts the odd and even positions of this last number and thereby produces the new subscriber identification number.

Once the fixed cellular terminal TCF has generated the new subscriber identification number, it is also stored in its low frequency signals and control module BFC.

Subsequently it transmits this new subscriber identification number to the subscriber identity module SIM, in which it is also stored for use later in normal operation of the fixed cellular terminal TCF, replacing that which was previously there. The fixed cellular terminal TCF has to employ this new subscriber identification number each time it requires access to the functions of the subscriber identity module SIM, in the event that the latter is inhibited and has to be enabled again (for example, after housekeeping operations, in which it is not necessary to maintain the subscriber identity module activated).

In this way the fixed cellular terminal TCF fully activates the subscriber identity module SIM, without any intervention on the part of the subscriber U being necessary and, on the other hand, the subscriber identification number stored in each subscriber identity module SIM is changed, this number being now unknown to either the subscriber or the operator of the system, thereby preventing use of the subscriber identity modules SIM outside their respective fixed cellular terminal TCF since, in the event of being removed from their corresponding fixed cellular terminal TCF, it will be necessary to insert the new subscriber identification number in order to re-enable them, but this number is unknown to all parties.

We claim:

1. A procedure for authentication of subscriber identity for a fixed cellular terminal (TCF) so as to allow the fixed cellular terminal to be used by a subscriber, said procedure implemented by a subscriber identity module (SIM) incorporated in the fixed cellular terminal (TCF) by making use of a subscriber identification number and by use of an internal memory within the TCF, characterized in that the fixed cellular terminal (TCF) performs the following steps:

storing a first subscriber identification number in the subscriber identity module (SIM), supplying to the subscriber identity module (SIM) a second subscriber identification number, fully activating the subscriber identity module (SIM) so as to allow the TCF to be used by the subscriber in the event that the first and second subscriber identification numbers coincide, and generating a new subscriber identification number and storing this new subscriber identification number in both the internal memory and in the subscriber identity module (SIM) if the first and second subscriber identification numbers coincide.

2. A procedure for authentication of subscriber identity according to claim 1, characterized in that the steps are implemented when installing the fixed cellular terminal (TCF).

3. A fixed cellular terminal (TCF) for use in access systems with mobile cellular technology for access by a set of subscribers (U) to a fixed network (RF), which comprises a subscriber identity module (SIM) that performs a subscriber identity authentication process; the fixed cellular terminal (TCF) being characterized in that the subscriber identity module (SIM verifies a subscriber identification number enabled by the TCF during the subscriber identity authentication process, and wherein the fixed cellular terminal (TCF) further comprises a means to store the subscriber identification number, a means to supply the subscriber identification module (SIM) with the subscriber identification number and thereby activate it fully in the event that a number supplied coincides with a number stored internally in the subscriber identity module (SIM), a means to generate a new subscriber identification number, and a means to store the new subscriber identification number in both an internal memory and in the subscriber identity module (SIM).

4. A fixed cellular terminal (TCF) according to claim 3, characterized in that when it is reinitialized, it employs the new subscriber identification number in order to verify the authenticity of the identity of the subscriber (U).

* * * * *

UNITED STATES PATENT AND TRADEMARK OFFICE
CERTIFICATE OF CORRECTION

PATENT NO : 5,854,976

DATED : December 29, 1998

INVENTOR(S): Garcia Aguilera et al.

It is certified that error appears in the above-identified patent and that said Letters Patent is hereby corrected as shown below:

Column 6, line 5 (claim 3, line 7) after "(SIM" insert ")".

Signed and Sealed this

Eighth Day of June, 1999

Attest:

Q. TODD DICKINSON

*Attesting Officer*   *Acting Commissioner of Patents and Trademarks*